(12) United States Patent
Chapin

(10) Patent No.: US 8,503,925 B2
(45) Date of Patent: Aug. 6, 2013

(54) FLEXIBLY TARGETING INFORMATION SENT OVER A BROADCAST COMMUNICATIONS MEDIUM

(75) Inventor: John M. Chapin, Arlington, MA (US)

(73) Assignee: TV Band Service LLC, Wilmington, NC (US)

( * ) Notice: Subject to any disclaimer, the term of this patent is extended or adjusted under 35 U.S.C. 154(b) by 373 days.

(21) Appl. No.: 13/019,627

(22) Filed: Feb. 2, 2011

(65) Prior Publication Data

US 2012/0195386 A1      Aug. 2, 2012

(51) Int. Cl.
*H04H 40/90*      (2008.01)
(52) U.S. Cl.
USPC ...... 455/3.01; 455/415; 455/3.04; 455/435.2; 375/259; 375/316; 705/14.42; 705/14.58
(58) Field of Classification Search
USPC ............... 455/3.01, 30.4, 3.06, 423, 435.2, 455/435.3, 456.2, 512, 67.11, 415; 375/259, 375/316; 705/14.58; 340/539.32; 709/203, 709/217, 218, 219; 707/769, 748, 766, 771
See application file for complete search history.

(56) References Cited

U.S. PATENT DOCUMENTS

| | | | |
|---|---|---|---|
| 8,271,520 B1 * | 9/2012 | Aman et al. | 707/769 |
| 2005/0073579 A1 * | 4/2005 | Lepine et al. | 348/100 |
| 2008/0114829 A1 * | 5/2008 | Button et al. | 709/203 |
| 2009/0212941 A1 * | 8/2009 | Vock et al. | 340/539.32 |
| 2011/0145057 A1 * | 6/2011 | Jones et al. | 705/14.42 |
| 2011/0307496 A1 * | 12/2011 | Jones et al. | 707/748 |

* cited by examiner

*Primary Examiner* — Tan Trinh
(74) *Attorney, Agent, or Firm* — Fish & Richardson P.C.

(57) ABSTRACT

A system for flexibly targeting information sent over a broadcast communications medium includes a sender of information signals each carrying information and a targeter for use by a user having a receiver with a targeter. There are a number of the receivers constructed and arranged to receive signals from the sender through a broadcast communications medium. The targeter includes a number of selectors associated with an action ID and a number of key value paired, constructed and arranged to indicate action to be taken by a user of a selected receiver in the condition that the selector evaluates to true given the values stored in the targeters.

12 Claims, 6 Drawing Sheets

FLEXIBLY TARGETING INFORMATION SENT OVER A BROADCAST COMMUNICATIONS MEDIUM

The present invention relates in general to flexibly targeting information, and more particularly over a broadcast communications medium.

BACKGROUND OF THE INVENTION

One approach to targeting information is unicast addressing. Each message sent contains a particular numeric address. Devices that receive the message compare the address value with an address stored in the device and only deliver the message if the two match. Another form of targeting is multicast addressing where certain ranges or types of addresses are prearranged to represent groups of devices rather than individual devices. A receiving device delivers the message if the message address matches the receiving device's specific address or that of any of the multicast groups configured into the receiving device.

Another approach involves addressing by labels rather than by numeric addresses. For example, a sender inserts a label into the message describing the type of receiver desired, such as a printer. Each receiver stores a set of labels and delivers messages that match at least one of the labels.

The above forms of targeting are forms of "push" targeting in which the sender identifies the recipient(s) of the message based on the address or label inserted into the message. Another form of targeting is "pull" targeting in which the receiving device determines which sent messages to deliver. For example, a form of pull targeting consists of inserting a text string that describes or identifies the contents of the message in the transmitted message. This text string is called a "descriptor." One form of descriptor is a stock ticker symbol, and this descriptor is inserted into any message containing news stories about the company identified by that symbol. Receiving devices store a set of descriptors and deliver messages whose descriptor match at least one of the stored descriptors.

In another form of pull targeting, the descriptor stored in a message is a structured set containing one or multiple elements that collectively describe or identify the contents of the message. Each element of the descriptor may be a string or a numeric value or other data type. Receiving devices store a set of logical formulas, each of which is evaluated against the elements of the descriptor in the message. If one or more of the formulas evaluate to true, the message is delivered.

It is an important object of the invention to provide improved targeting.

BRIEF SUMMARY OF THE INVENTION

According to the invention, a system is characterized by the benefits of both push and pull targeting to meet a wide range of user needs and provide control over the actions that occur when the device determines that a message should be delivered.

According to a feature of the invention, targeting is accomplished with a data structure called a targeter that is an expression attached to a transmitted data package or stored in a receiving device and that contains logical formulas called selectors, each paired with a short code, or action identifier, and a set of key values pairs that are descriptors.

After a device receives a message targeting occurs as follows. The device evaluates each selector in the message and each selector stored in the device. If any selector evaluates to true, the action described by the action identifier paired with that selector is carried out.

The selectors are typically compound Boolean expressions. There may be sub expressions that may be other Boolean expressions or function invocations. Functions that may be used in selectors include relational operators, such as equals or less than. Sub expressions may name keys from the descriptors in the message or the descriptors stored in the device.

Evaluating a Boolean expression of this type is a well-understood procedure described in many computer science textbooks and follows a process whose outcome is the same as if one were to: make a copy of the expression, replace each occurrence of a key with a corresponding value from the list of descriptors, identify function calls or relational expressions at the leaves of the Boolean expression tree and replace each function call or relational expression with the result of evaluating that function call or relational expression, then evaluate the resulting Boolean expression to determine a final value of true or false. If some key in the expression is not present in the descriptor list, the final value is false irrespective of the other parts of the expression.

Numerous other features, objects and advantages of the invention will become apparent from the following detailed description when read in connection with the accompanying drawing in which:

DETAILED DESCRIPTION

Figure 1:
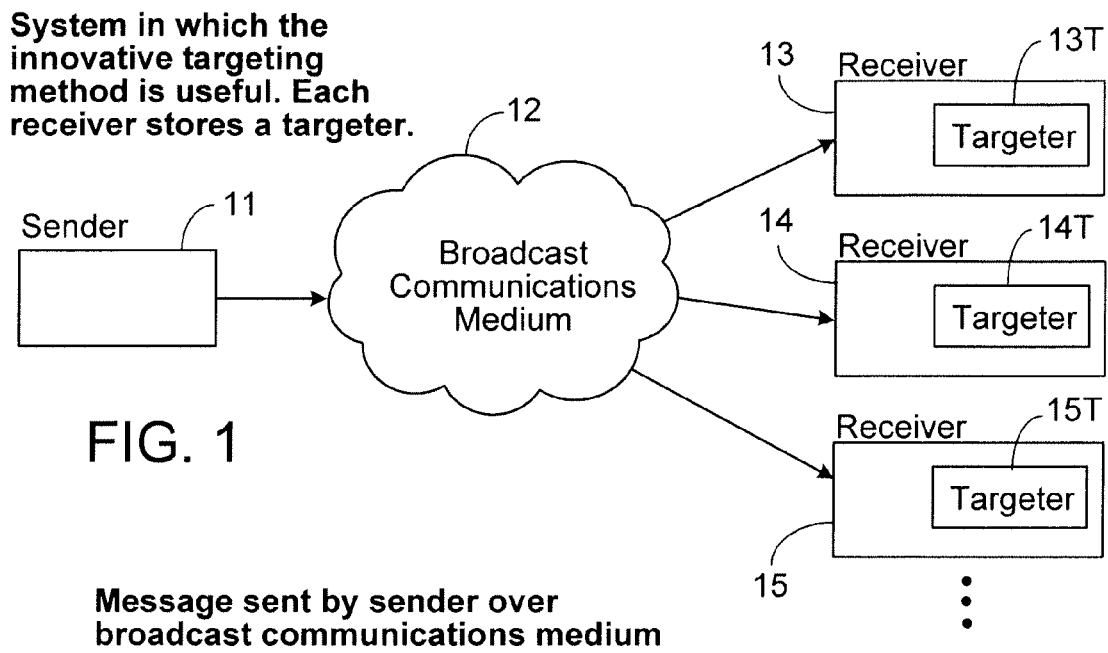
FIG. 1 is a block diagram of a system according to the invention.

With reference to the drawing and more particularly FIG. 1, there is shown a diagrammatic representation of a system embodying the invention. A sender 11 transmits information including a targeter over broadcast communications medium 12 to receivers such as 13, 14 and 15 each storing a targeter such as 13T, 14T and 15T, respectively.

Figure 2:
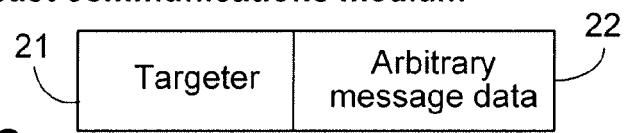
FIG. 2 is a representation of a message sent by the sender of FIG. 1 over the broadcast communications medium of FIG. 1.

Referring to FIG. 2, there is a diagrammatic representation of a typical message sent by sender 11 over broadcast communications medium 12 including targeter 21 and arbitrary message data 22.

Figure 3:
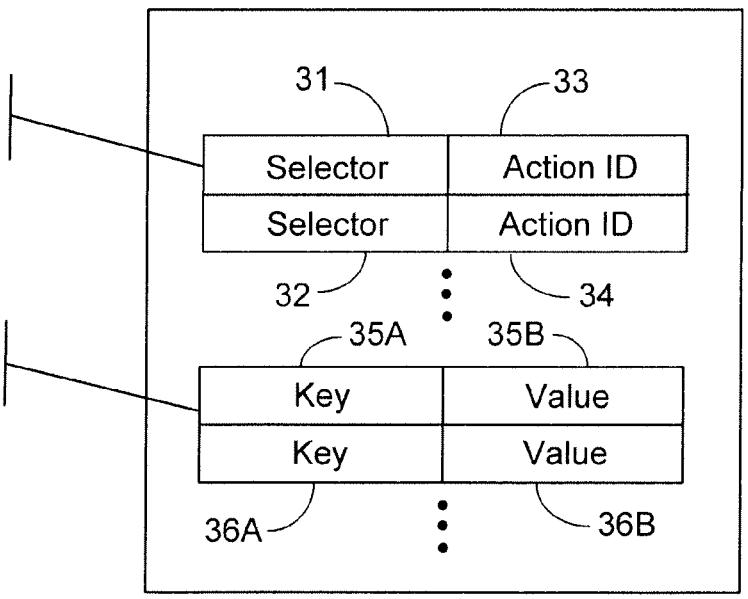
FIG. 3 is a diagrammatic representation of contents of a targeter.

Referring to FIG. 3, there is shown a diagrammatic representation of the contents of targeter 21. There are selectors, such as 31 and 32 associated with action identifiers, such as 33 and 34, respectively. Each descriptor comprises a key value pair such as 35A, 35B and 36A, 36B.

When transmitted, targeters are represented as a potentially short XML (Extensible Markup Language) document following a widely used DTD or XSD (Document Type Definition, XML Schema Definition: declarations that define a document type for the XML language). If XML is not feasible in a given deployment for some reason, any serializeable representation may be used. In a device they may be stored any convenient representation.

A selector is a Boolean expression over the keys and the descriptors in the message and the descriptor stored in the receiving device. The syntactic representation of selectors may be one of many representations with identical semantics that will be apparent to one of ordinary skill in the art.

A naming scheme indicates whether a key appearing in a selector refers to a descriptor in the message or to a descriptor stored in the receiving device. In one possible naming scheme, when a key called "Role" appears in a selector, it may appear as "Message.Role" or as "Receiver.Role."

The Boolean expression may be simple or compound. An example of a simple expression is "Receiver.Role=Commander." An example of a compound expression is "Receiver.Role=Commander AND Receiver.Status!=Emergency." A compound expression uses the standard Boolean connectors AND, OR, and NOT to conjoin other expressions which may be simple or compound.

Simple expressions may use the standard relational operators or any of the set of functions provided by the receiver device. For example there can be a distance function supporting an expression like "Distance (Receiver. Location, Message. Target Location)<5" that targets receivers within five miles of a specified target location.

An action identifier is short code describing a delivery action to be taken when a selector evaluates to True. Example action identifiers are codes commanding:

Display message title (for later selection by user)

Display or play message contents immediately

Execute message (for example the data package may contain a software application)

Deliver message contents to an application (identified by a port number stored in one of the descriptors of the targeter in the message).

In some embodiments one or more preconfigured selectors may be automatically added to the list of selectors evaluated against the descriptors before targeting. An example would be "Receiver.Address=Message.Address" with an appropriate associated action identifier.

Descriptors were shown in FIG. 3 as key-value pairs. In some embodiments the keys are stored explicitly in the descriptors. In other embodiments the keys are not stored explicitly but are implicitly represented based on the position of the descriptors in the data structure. In still other embodiments some keys are implicitly represented and some are stored explicitly. In the following example descriptors, the key strings to be used are not stated and can be chosen to be any appropriate string as long as the key of each descriptor used in a particular system is unique.

The targeter stored in a receiver has zero or more descriptors. The values in some of the descriptors may change over time. Examples of possible descriptors in the targeter stored in a receiver include the following.

An address that uniquely identifies the receiver device among all the devices that may receive the same transmission. The address may be an arbitrary string.

The name of the user to which the receiver is assigned.

The role of the user to which the receiver is assigned (e.g. some code or string meaning "firefighter", "chief", "k-9 officer", and so on.)

The unit to which the user is assigned.

The device type of the receiver.

Arbitrary data values that planners have selected to identify personnel in various ways, for example their agency, the government entity which it reports to ("city", "county", etc.), or certifications ("may enter hazmat zone").

The current location of the receiver (from GPS or other source), represented as longitude and latitude The current status of the receiver (for example, normal vs emergency mode depending on whether the user has selected emergency mode operation)

Arbitrary data values that applications running on the receiver have stored in the descriptor list, for example what road a vehicle is currently driving on.

The targeter inserted into a transmitted message also has zero or more descriptors. Examples include the following.

A message ID which is a large integer that uniquely identifies the transmission.

Sender identification or address

Urgency

A port number

A cryptographic signature.

An important feature of the invention (to reduce the cost of sending the targeter over the air) is that keys and action IDs may be implicitly understood by the receiver. For example, the first data item in the descriptor may be known to be the Urgency code (Message.Urgency=Emergency would appear in the receiver selector, but the string "Urgency" never appears in the message). Similarly, an action ID may be omitted and the action to be carried out may be understood based on which selector this is, or there may be a default operation such as display to user.

Figure 4:
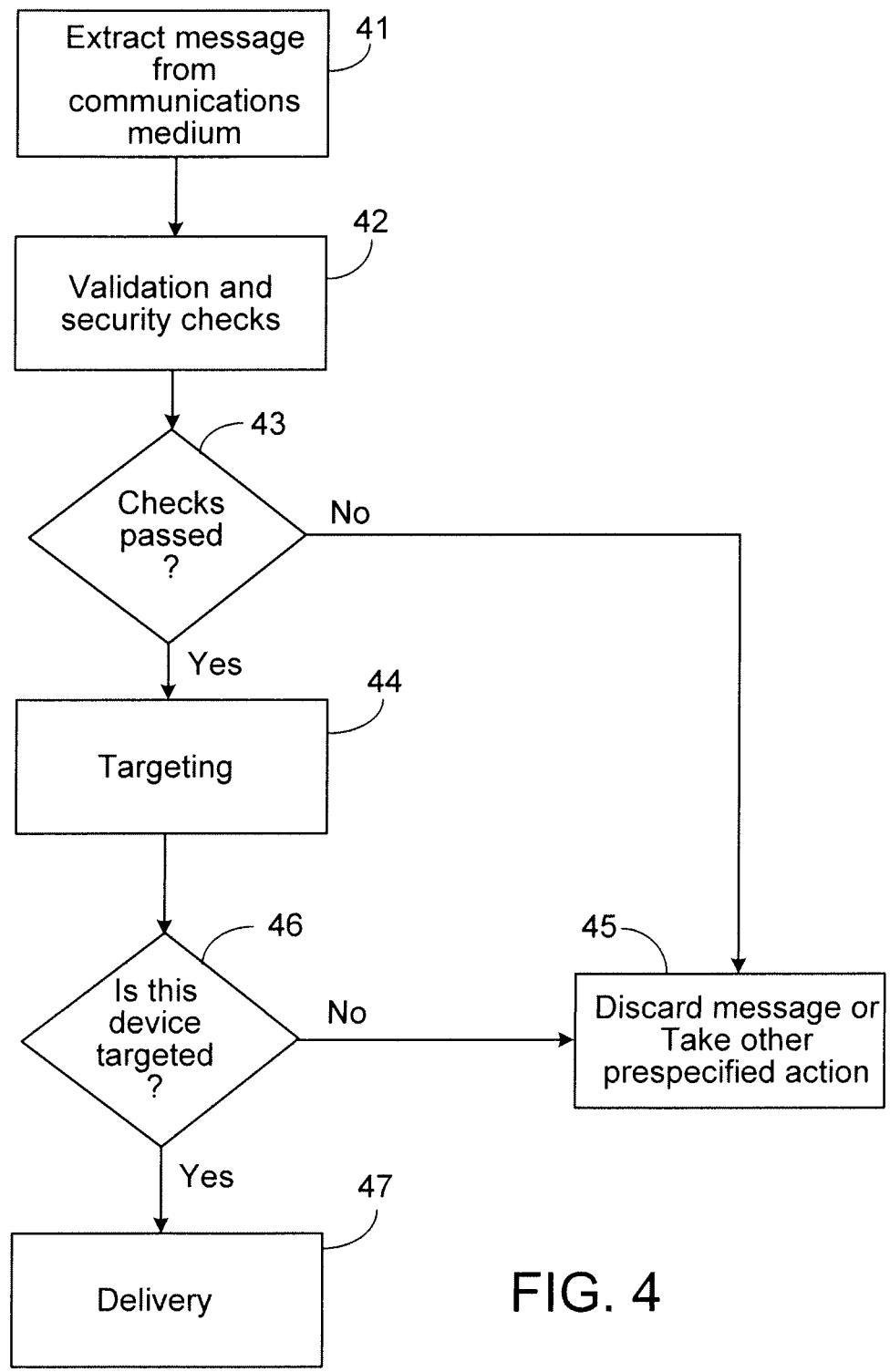
FIG. 4 is a flow diagram of the process in a receiving device according to the invention.

Referring to FIG. 4, there is shown a flow diagram illustrating the behavior of a receiving device. The first step 41 involves extracting the message from the communications medium. The next step 42 involves validation and security checks. The next step 43 involves a decision of whether the checks passed; if yes, proceeding to step 44 of targeting; if no, proceeding to step 45 discard message or take other prespecified action.

The next step after targeting 44 is decision step 46. If the device is targeted, it proceeds to the delivery step 47 in which all actions in the action list are carried out. If the device is not targeted, it proceeds to discard message or take other prespecified action 45.

Figure 5:
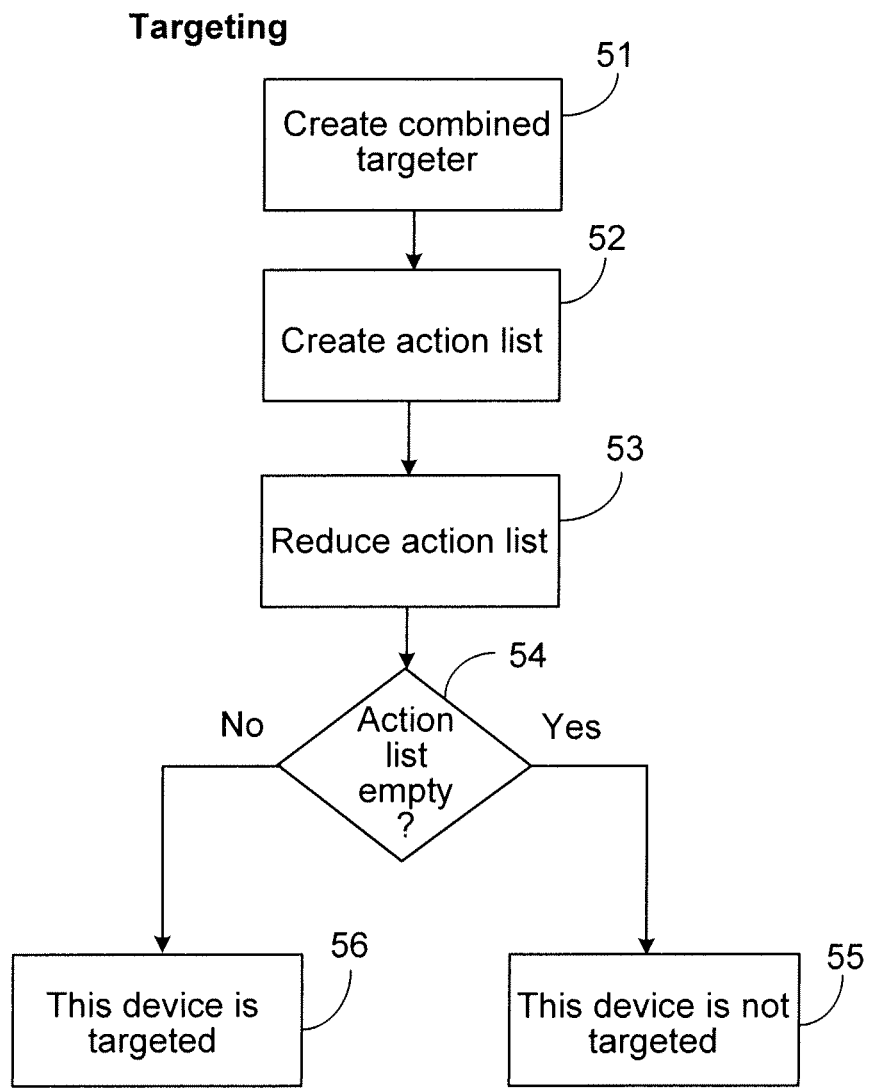
FIG. 5 is a flow diagram of the targeting process according to the invention.

Referring to FIG. 5, there is a flow diagram illustrating the targeting process. The first step 51 involves creating a combined targeter. The next step 52 involves creating an action list. The next step 53 involves reducing the action list. The next step 54 is a decision step; if the action list is empty, proceed to step 55 indicating this device is not targeted. If the action list is not empty, proceed to the next step 56 indicating that this device is targeted.

Figure 6:
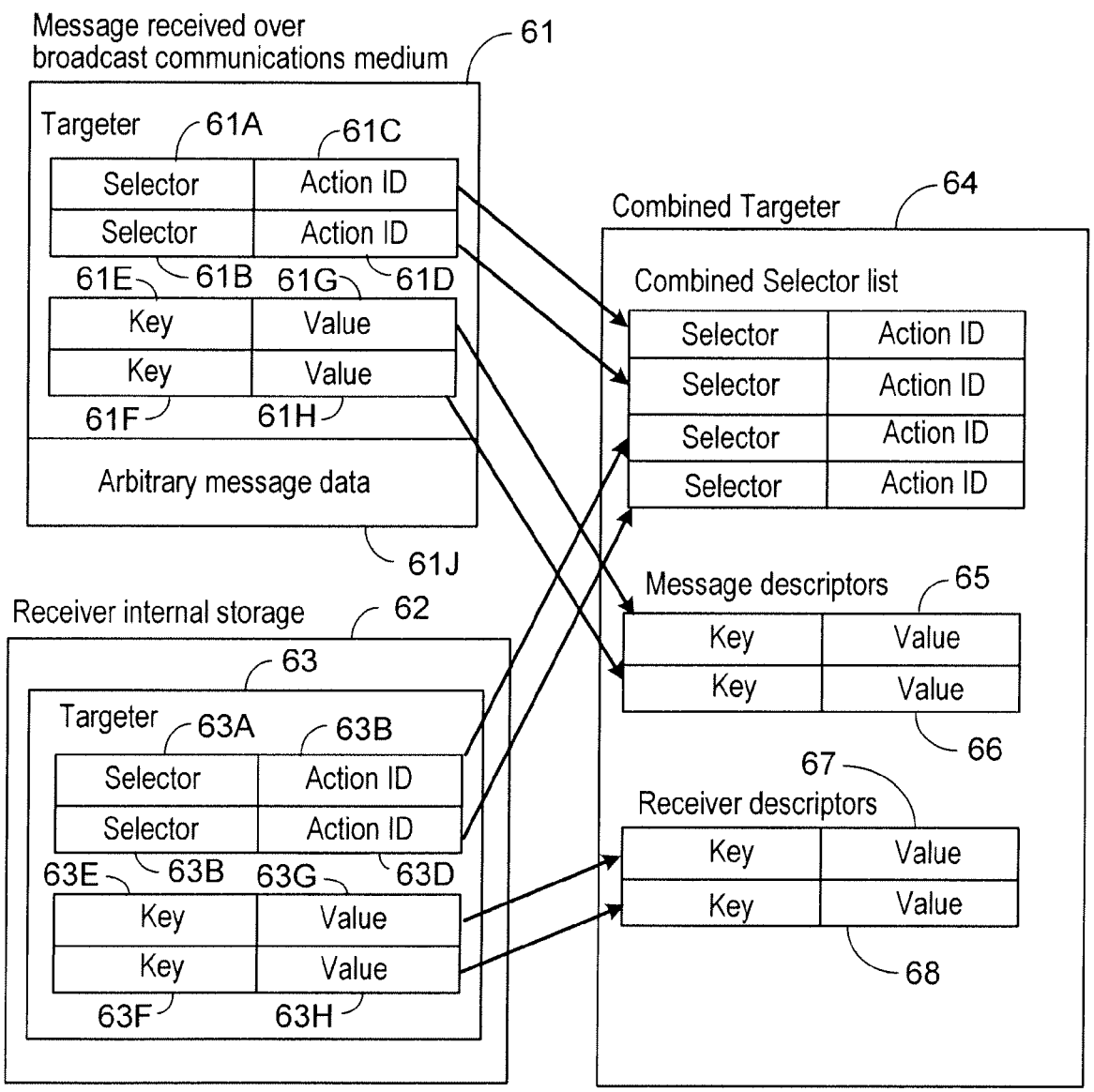
FIG. 6 is a block diagram illustrating the creation of a combined targeter.

Referring to FIG. 6, there is shown a block diagram illustrating the logical arrangement of creating a combined targeter. A message received over the broadcast communications medium 12 contains targeter 61 shown having a pair of selectors 61A and 61B associated with action ID's 61C and 61D, respectively and keys 61E and 61F associated with values 61G and 61H, respectively and storing arbitrary message data 61J.

Receiver internal storage 62 has targeter 63 that is structured like targeter 61 with components identified by 63 with a letter the same as a corresponding component in targeter 61.

Combined targeter 64 is shown with four selectors receiving action ID from the action ID's in targeters 61 and 62 associated with respective action ID's. Combined targeter 64 also has message descriptors 65 and 66 that receive the key value from targeter 61 and receiver descriptors 67 and 68 that receive key values from the receiver internal storage 62.

Figure 7:
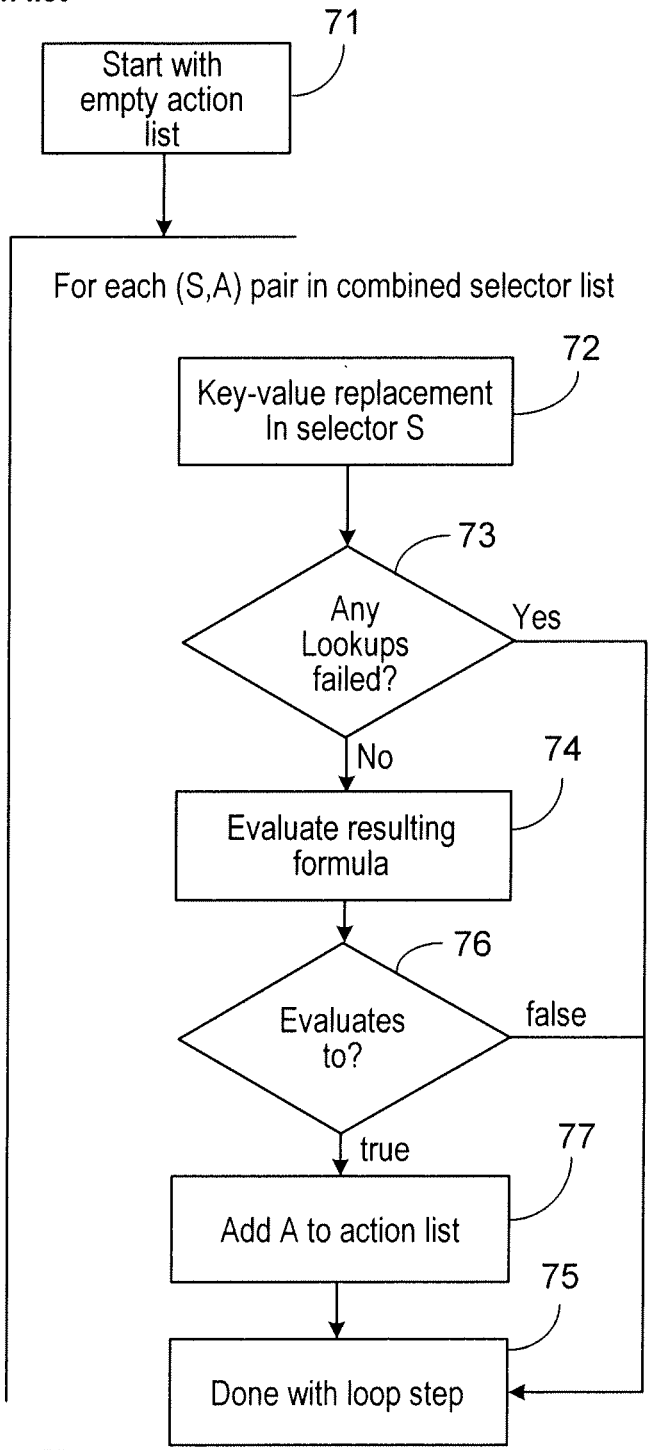
FIG. 7 illustrates the process of creating an action list.

Referring to FIG. 7, there is shown a flow diagram illustrating creation of an action list. The process begins with start with empty action list 71. For each pair of selector and action ID in the combined selector list, represented as (S,A) in the diagram, step 72 involves key-value replacement in selector S, decision step 73 deciding whether any lookups failed and advancing to step 74 if the answer is no to evaluate resulting formula step 74 and to done with loop step 75 if the answer is yes. Following evaluate resulting formula step 74 the next decision step 76 evaluates to: if false goes to done with loop step 75 and if true goes to add A to action list 77 followed by going to done with loop step 75.

Figure 8:
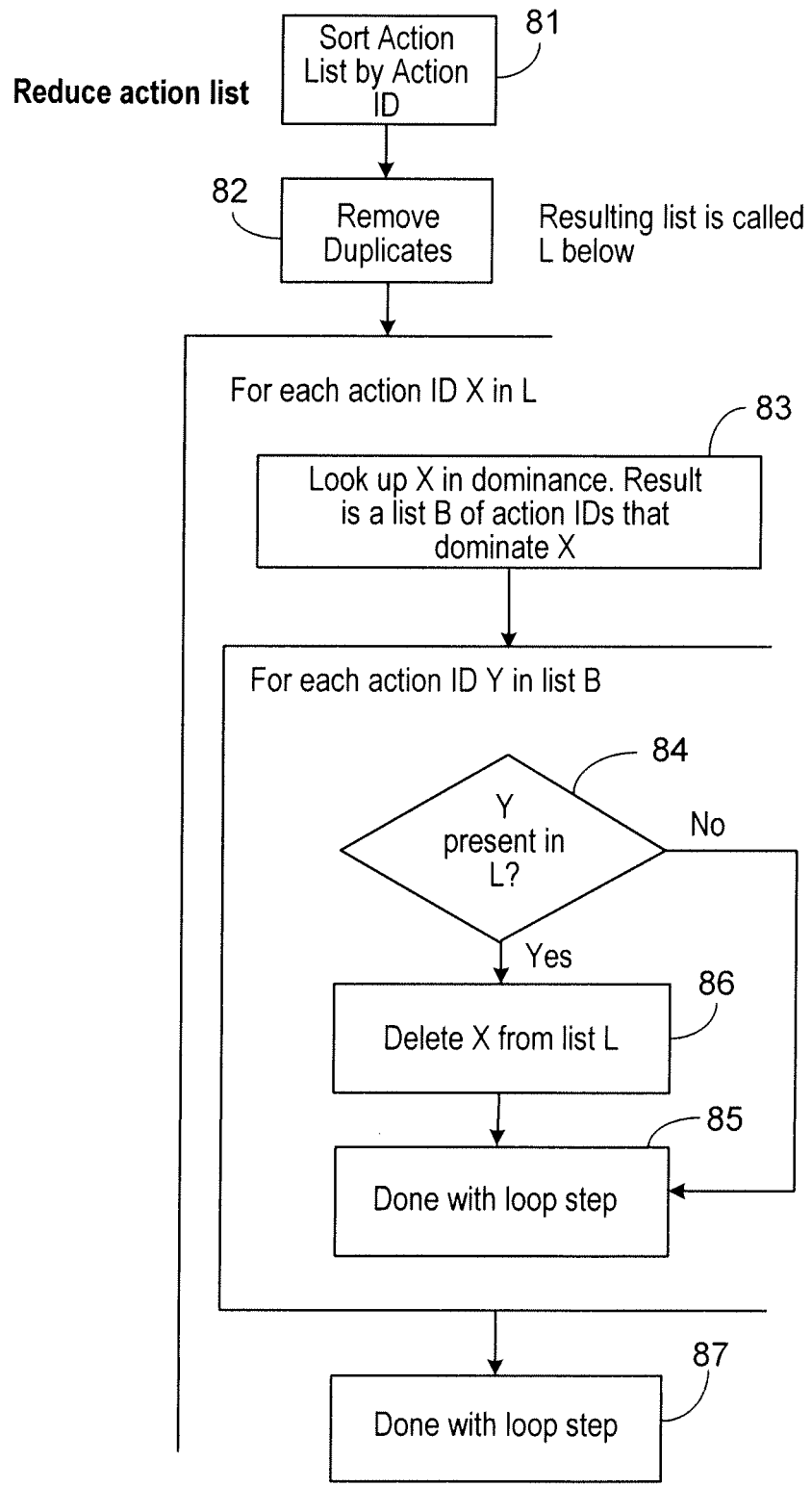
FIG. 8 illustrates the process of reducing the reaction list.

Referring to FIG. 8, there is shown a flow chart illustrating reducing the action list. The first step is to sort action list by action ID 81, then remove duplicates step 82 with the resulting list being called L below. Looping over each action ID in L, called X in the following, the next step 83 involves looking up X in a preconfigured dominance table with the result is list B of action IDs that dominate X. There follows for each action ID Y in list B advancing to a decision step 84 if Y not present in L proceeding to done with loop step 85 and if yes, proceed to delete X from list L step 86 followed by done with loop step 85. This ends the loop over each action ID in list B, the next step is done with loop step 87 for the loop over each action ID in list L.

An example of push/pull targeting follows. A citizen sends a message to the 911 center reporting a fire at $4^{th}$ and main streets. The message has an attached picture of the fire. (Support for multimedia attachments is a key attribute of next-generation 911 systems).

When the 911 center dispatches firefighters to the scene, it additionally broadcasts the picture of the fire provided by the citizen, using the targeting method to assure the picture reaches the right units in the field. In range of the broadcast there may be dozens or hundreds of public safety officers, many of whom should not be interrupted from their jobs by this picture because it is not relevant to them.

The targeter in the message includes the following information. Some of this information would be represented by numeric codes and some of the key names would be omitted as described elsewhere, to shorten the message length. Hypothesize that LAT and LONG are the numerical latitude and longitude of the intersection of $4^{th}$ and main street.

| Descriptors | |
|---|---|
| Contents | JPEG Picture |
| Incident status | Emergency |
| Incident type | Fire |
| Selectors | Actions |
| Receiver.Agency = FireDepartment AND Distance(Receiver.Location, LAT, LONG) < 5 | Display |
| Receiver.Agency = FireDepartment AND Distance(Receiver.Location, LAT, LONG) >= 5 | Store in local storage |

Receivers installed in fire trucks and other fire department vehicles contain targeters with the following information (among other descriptors and selectors).

| Descriptors | |
|---|---|
| Agency | FireDepartment |
| Location | CURRENTLAT, CURRENTLONG |

When the message containing the first targeter arrives at a receiver in a fire department vehicle containing the second targeter, one of the two selectors in the message's targeter will evaluate to true. Thus depending on the location of the fire vehicle, either the image will be automatically displayed (if the vehicle is within 5 miles of the fire) or it will be stored allowing the user to view it if desired by selecting from a local menu.

The power of the targeting system becomes apparent in considering another receiver, this one assigned to a police officer whose job is to provide support for the fire department's needs. This police officer's receiver is configured with a targeter that includes the following descriptors and selectors, among others.

| Descriptors | |
|---|---|
| Agency | PoliceDepartment |
| Location | CURRENTLAT, CURRENTLONG |
| Selectors | Actions |
| Message, Incident type = Fire | Display |

When a message containing the first targeter arrives at the police vehicle containing the third targeter, the selector in the receiver evaluates to true. Thus the image of the fire will be automatically displayed to the police officer, even though the targeter in the message did not explicitly mention the need to deliver the message to that officer. What this shows is both push and pull operating at the same time: the message is pushed to the fire vehicles, and pulled by the police vehicle.

The combination of push and pull targeting in a single system enables a range of flexible operational behaviors, so the system can be easily customized to deliver the right information to the right people with minimal repetition of messages.

There has been described novel apparatus and techniques for flexibly targeting information sent over a broadcast communications medium. It is evident that those skilled in the art may now make numerous uses in modifications of and departures from the specific apparatus and techniques disclosed herein without departing from the inventive concepts. Consequently the invention is to be construed as embracing each and every novel feature and novel combination of features present in or possessed by the apparatus and techniques herein disclosed.

What is claimed is:

1. A system for flexibly targeting information sent over a broadcast communications medium comprising,
   a sender of information signals each carrying information and a targeter for use by a user having a receiver with a targeter,
   a plurality of said receivers constructed and arranged to receive signals from the sender through a broadcast communications medium,
   each targeter including a one or more selectors associated with an action ID and one or more key value pairs, where a selector is a compound Boolean expression potentially including function call subexpressions, and where the action IDs associated with some or all selectors and the keys for some or all key value pairs may be omitted if understood by the receiver according to a prearranged system, constructed and arranged to indicate action to be taken by a selected receiver or a user of a selected receiver in the condition that a selector evaluates to true given the values stored in the targeters.

2. A system for flexibly targeting information sent over a broadcast communication medium in accordance with claim 1 wherein the action IDs are present.

3. A system for flexibly targeting information sent over a broadcast communications medium in accordance with claim 1,
wherein said receiver is constructed and arranged to also pull information of interest to a user associated with the receiver that is targeted for use by a different user.

4. A system for flexibly targeting information sent over a broadcast communications medium in accordance with claim 3,
Wherein said user associated with the receiver is associated with one public safety agency or unit and the different user is associated with a different public safety agency or unit and the second user desires to see information satisfying specific criteria sent to the first user.

5. A system for flexibly targeting information sent over a broadcast communications medium in accordance with claim 4,
wherein said user associated with the receiver is a policeman and the different user is a fireman and the information of interest is the location of a fire.

6. A receiver constructed and arranged to receive signals from a sender through a broadcast communications medium carrying information and a targeter for use by a user,
each targeter including a one or more selectors associated with an action ID and one or more key value pairs, where a selector is a compound Boolean expression potentially including function call subexpressions, and where the action IDs associated with some or all selectors and the keys for some or all key value pairs may be omitted if understood by the receiver according to a prearranged system,
constructed and arranged to indicate action to be taken by a selected receiver or a user of a selected receiver in the condition that a selector evaluates to true given the values stored in the targeters.

7. Apparatus in accordance with claim 6 wherein the targeter includes a selector associated with an action ID and descriptors comprising a key/value pair.

8. A method of using the receiving device of claim 7 including,
extracting a message from the communications medium, checking validation and security in the extracted message,
targeting if the checks are passed,
and delivering the message if the device is targeted.

9. The method of claim 8 wherein the targeting includes creating a combined targeter,
creating an action list,
reducing the reaction list,
when the action list is empty indicating that the device is not targeted, and
when the action list is not empty indicating the device is targeted.

10. A method in accordance with claim 9 and further including creating a combined targeter based on the message received over the broadcast communications medium and receiver internal storage each having selectors and associated action ID and key values, and
forming the combined targeter with selectors and action ID's and key value pairs from the message received over the broadcast communications medium and the receiver internal storage.

11. The method in accordance with claim 10 including creating an action list by starting with an empty action list and for each selector, action pair in a combined selector list, creating a key-value replacement in the selector, determining whether any lookup failed, evaluating a resulting formula where no lookups failed, evaluating to true or false, adding to the action list if true and completing the step after adding to the action list, determining a lookup fail or evaluating to false.

12. A method in accordance with claim 11 wherein reducing the action list includes,
starting the action list by action ID,
removing duplicates, creating a list L with action IDs', looking up X in a dominance table to create a list B of action IDs that dominate,
for each action ID Y in list B determining whether Y is present in L,
if present deleting X from list L and completing the loop step after deleting X from list L or determining Y is not present in list L.

* * * * *